Figure 1:
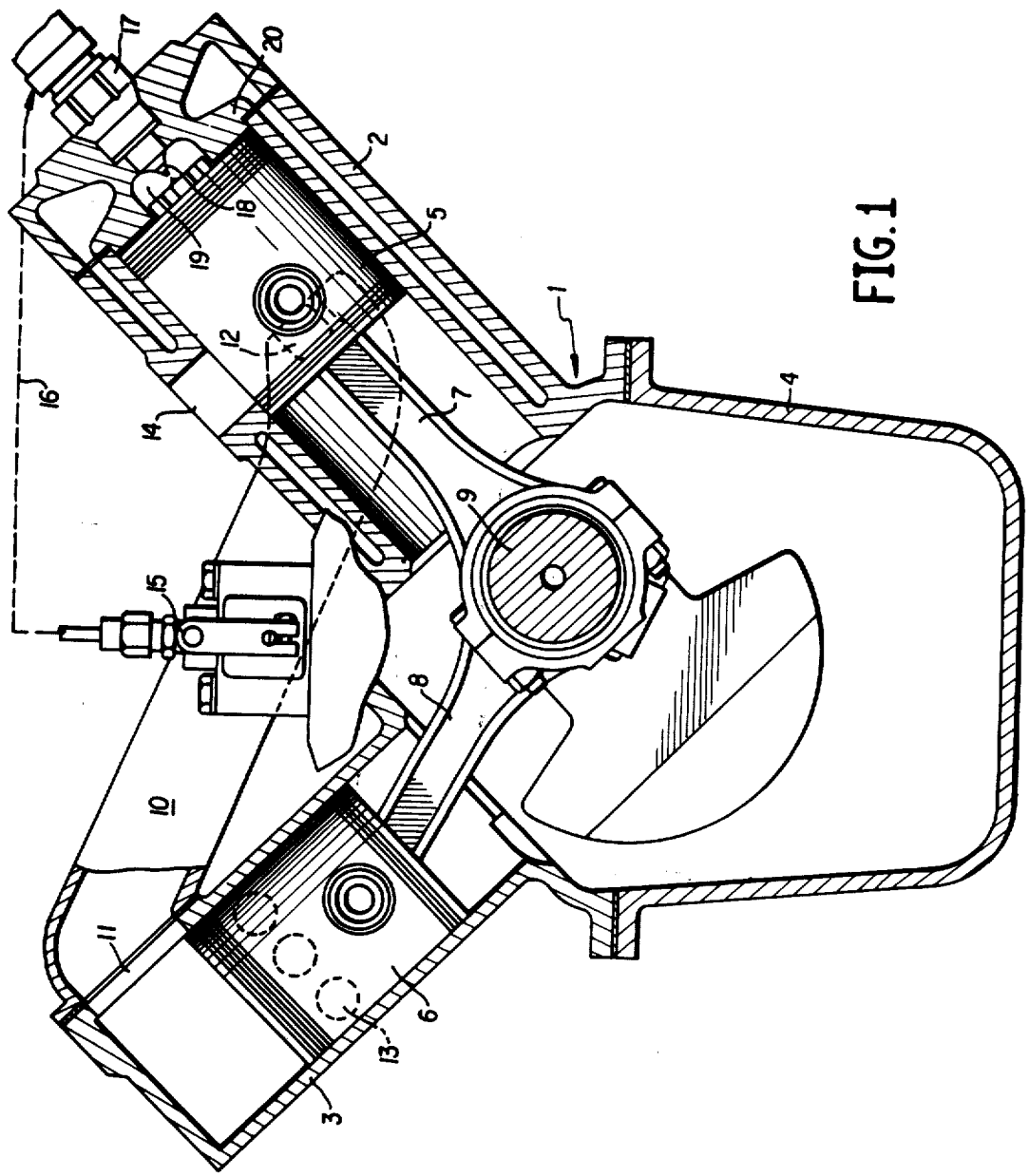

United States Patent [19]
Anderson et al.

[11] 3,892,208
[45] July 1, 1975

[54] MODIFIED INJECTION SPRAY CHARACTERISTICS FOR SPACED BURNING LOCI ENGINES

[75] Inventors: Harold Elden Anderson, Playa Del Rey; Perry Lester Kruckenberg, Los Angeles, both of Calif.

[73] Assignee: McCulloch Corporation, Los Angeles, Calif.

[22] Filed: July 5, 1972

[21] Appl. No.: 269,232

[52] U.S. Cl. ............ 123/32 R; 123/30 R; 123/33 R
[51] Int. Cl. .............................................. F02b 3/04
[58] Field of Search ............ 123/32 JV, 32 B, 32 R, 123/30 R, 33 R; 239/562, 563, 533

[56] References Cited
UNITED STATES PATENTS

| | | | |
|---|---|---|---|
| 1,833,080 | 11/1931 | Kenworthy | 239/533 |
| 2,274,315 | 2/1942 | Amery | 239/533 |
| 2,886,014 | 5/1959 | Konrad et al. | 239/533 |
| 3,543,735 | 12/1970 | Krackenberg | 123/32 B |
| 3,695,235 | 10/1972 | Anderson | 123/32 JV X |

FOREIGN PATENTS OR APPLICATIONS

| | | | |
|---|---|---|---|
| 933,374 | 9/1946 | France | 123/32 JV |
| 159,669 | 11/1954 | Australia | 123/32 JV |

*Primary Examiner*—Charles J. Myhre
*Assistant Examiner*—Tony Argenbright
*Attorney, Agent, or Firm*—Burns, Doane, Swecker & Mathis

[57] ABSTRACT

A method for improving the fuel injection characteristics in relation to diesel engines operating on the spaced burning loci principle as featured in United States Kruckenberg et al. U.S. Pat. No. 3,543,735.

At lower engine speed and/or load conditions, the injection nozzle is caused to generate a generally billowing or diverging spray pattern, while at higher or normal engine speed and/or load conditions the injection nozzle is caused to generate relatively solid streams of fuel. Preferably, these "solid" streams are directed into individualized or discrete agitation zones and burning loci associated therewith. The diverging spray pattern additionally serves to improve fuel ignition during the commencement of each engine working stroke.

1 Claim, 7 Drawing Figures

MODIFIED INJECTION SPRAY CHARACTERISTICS FOR SPACED BURNING LOCI ENGINES

RELATED CASES

This invention is directed to improved fuel injection techniques which are intended to improve the fuel combustion characteristics of internal combustion engines, particularly those of the type described in U.S. Kruckenberg et al. application Ser. No. 93,269, now abandoned, filed Nov. 27, 1970, and entitled "Improved Combustion System for Internal Combustion Engines" and in U.S. Kruckenberg et al. U.S. Pat. No. 3,543,735. The aforesaid Kruckenberg patent and application are each assigned to the assignee of the present application.

This present invention entails an aspect of certain overall combinational concepts which are featured in a U.S. Pat. application, filed of even date herewith, entitled "Method and Apparatus for Improving the Fuel Injection Characteristics of Internal Combustion Engines," designating Harold Elden Anderson and Perry Lester Kruckenberg as co-inventors, and assigned to the assignee of this present application.

GENERAL BACKGROUND, OBJECTS AND SUMMARY OF INVENTION

In U.S. Kruckenberg et al. Pat. No. 3,543,735, and in U.S. Kruckenberg et al. application Ser. No. 93,269, a unique type of engine and mode of engine operation are described.

Fundamentally, the concept featured in this Kruckenberg et al. patent and application pertains to the generation of a series of spaced burning loci in the interior or working chamber of an internal combustion engine. Peripherally confined agitation zones are individually associated with these loci. During the working or "down" stroke of a piston within the engine working chamber and at a normal speed and/or load condition, fuel is injected in the form of relatively solid streams, with individual streams being directed into individual agitation zones and burning loci associated therewith. The bulk of the fuel is injected during the working or "down" stroke.

The benefits produced by this spaced burning loci principle are substantial and entail a reduction in peak combustion chamber pressure, a reduction in the rate of pressure rise in the chamber, a reduction in engine noise level, a reduction in engine exhaust and combustion temperatures, a reduction in the generation of noxious oxides of nitrogen, a reduction in carbonization tendencies, an improvement in specific fuel consumption, an improvement in starting characteristics, and an overall ability to reduce the size of an engine in relation to a desired horsepower output.

Such significant advances in the engine art notwithstanding, it has been discovered that further steps, when implemented, will improve the operating characteristics of an engine, particularly an engine of the type featured in the aforesaid Kruckenberg patent and application during low load and/or engine speed conditions.

While the burning loci principle is uniquely advantageous, particularly at normal and high speed and/or load conditions, it has been unexpectedly discovered that at low speed and/or load conditions it may be preferable to modify the manner in which fuel is transmitted into the agitation zones which determine the location of and are operable to generate the aforesaid burning loci.

At normal or high speed and/or load conditions, fuel is injected as individualized, generally cohesive or "solid" streams directed straight into the various individual agitation zones and burning loci.

However, at low speed and/or load conditions, it is now believed desirable to forego injection of solid fuel streams, as above noted, and instead inject fuel into a precompression chamber communicating with the agitation zones in the form of a diverging or billowing spray (The term "precompression chamber," as here used, means a chamber, auxiliary to the working chamber, which receives compressed gas on the piston compression stroke and from which gas is passed to the working chamber during the piston working stroke). In short, at a low speed and/or load condition (i.e. at an idle or near idle condition), i.e. where the temperature of the working or combustion chamber is relatively low, the burning loci engine appears to perform more smoothly and enjoy more even and complete burning if the degree of fuel atomization occurring between the exit orifices of the injection nozzle and the agitation zones is increased.

This increase in atomization at low speed and/or load conditions is achieved through this invention by producing a generally radial pattern of fuel flow leading to the injection nozzle orifice means. This radial inflow pattern produced a generally diverging, or billowing, and thus relatively atomized, spray of fuel exiting from the orifice means and passing into the precompression chamber which communicates with the aforesaid agitation zones. At relatively higher or normal speed and/or load conditions, the radial flow pattern is supplanted by a more or less axial flow of fuel leading to the orifice means and, as a result of this relatively axial flow pattern, generally solid or discrete fuel streams are ejected from the nozzle orifice means.

The diverging or billowing spray pattern also serves to facilitate the ignition of fuel at the commencement of each engine working stroke.

The invention contemplates various combinations of apparatus means which are able to perform these method steps and attain the improvements in engine operating characteristics above noted.

In describing the invention, reference will be made to certain preferred embodiments, it being understood that this reference is by way of example and is not intended to be restrictive in relation to the scope of the invention.

INTRODUCTION

Before discussing the novel and advantageous features of this invention, it is appropriate to review the context within which the invention may be most advantageously practiced.

While aspects of the invention may be utilized in conjunction with a variety of engines, it is believed that particularly significant results will be achieved when the present invention is employed to improve the operating characteristics of the spaced burning loci type engine described in the aforesaid U.S. Kruckenberg et al U.S. Pat. No. 3,543,734, and the aforesaid Kruckenberg et al application Ser. No. 93,269.

The disclosures of the Kruckenberg et al U.S. Pat. No. 3,543,735, and Kruckenberg et al application Ser.

No. 93,269, are incorporated herein by reference. With respect to significant variations in engine structural characteristics which may be employed in practicing the invention and with respect to dimensional and operational parameters, attention is invited in particular to disclosure of the aforesaid Kruckenberg et al application.

DRAWINGS

The appended drawings illustrate structural details of certain preferred embodiments of the invention.

Figure 2:
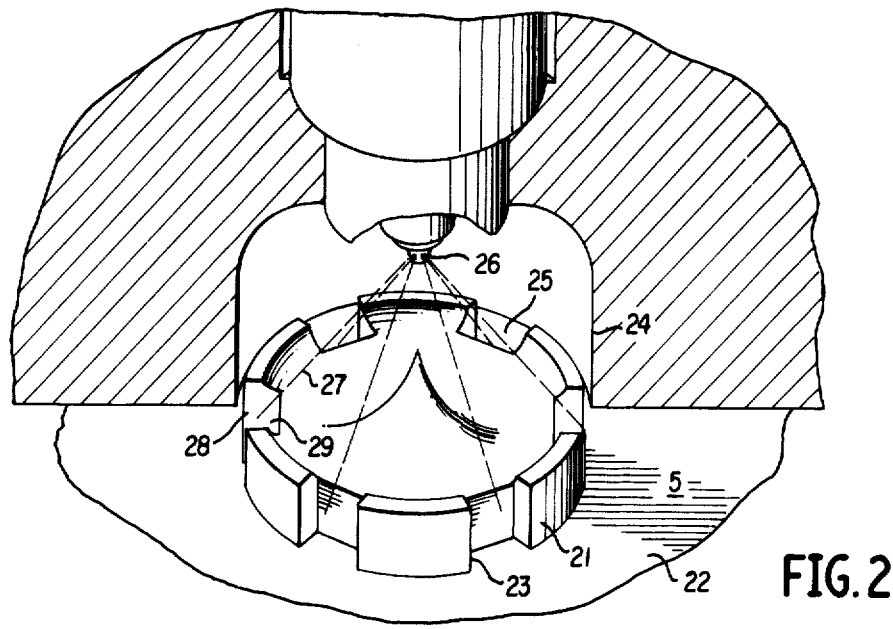
Figure 3:
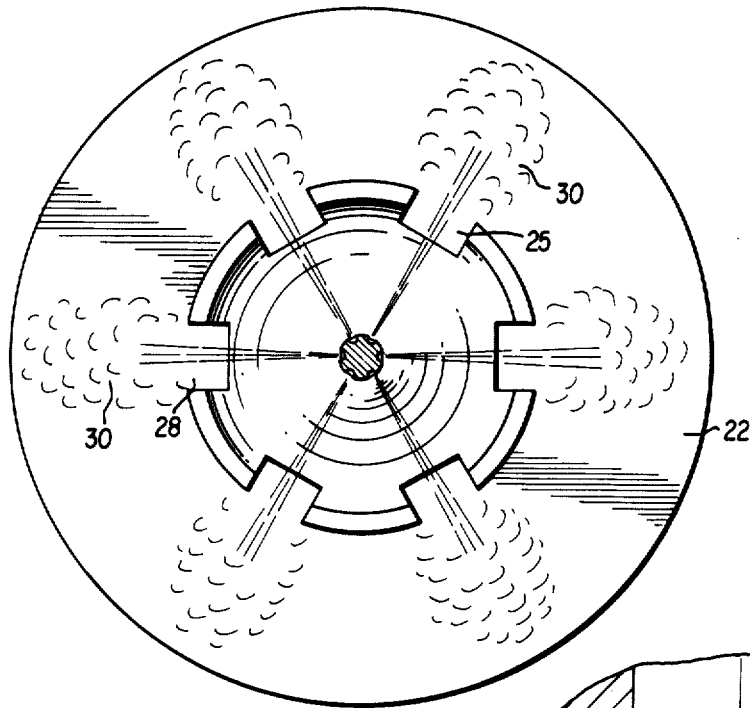
Figure 4:
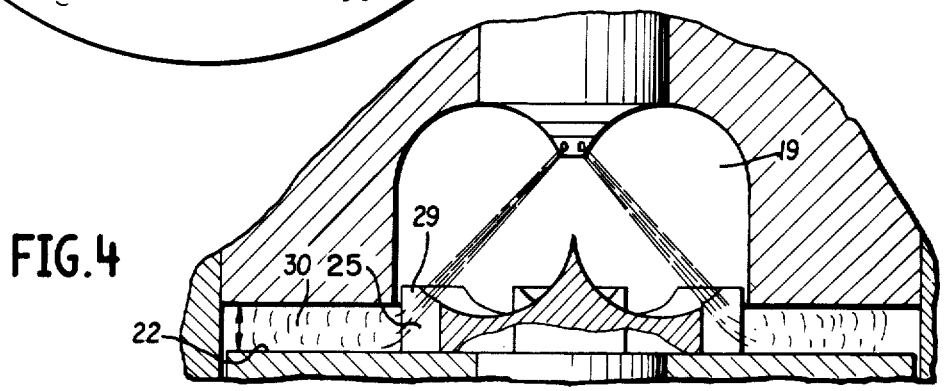
Figure 6:
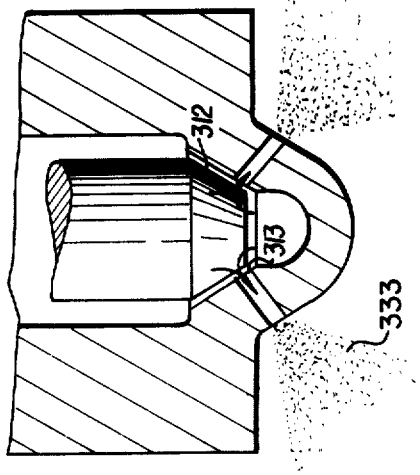
Figure 7:
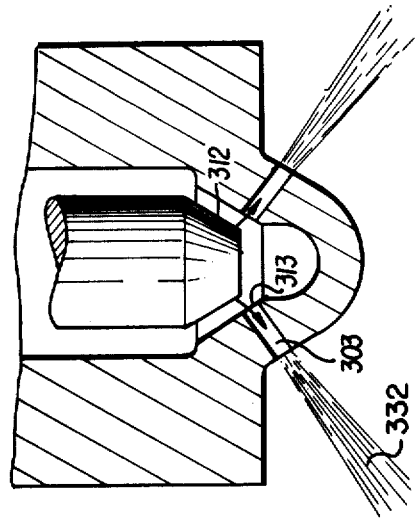
Figure 5:
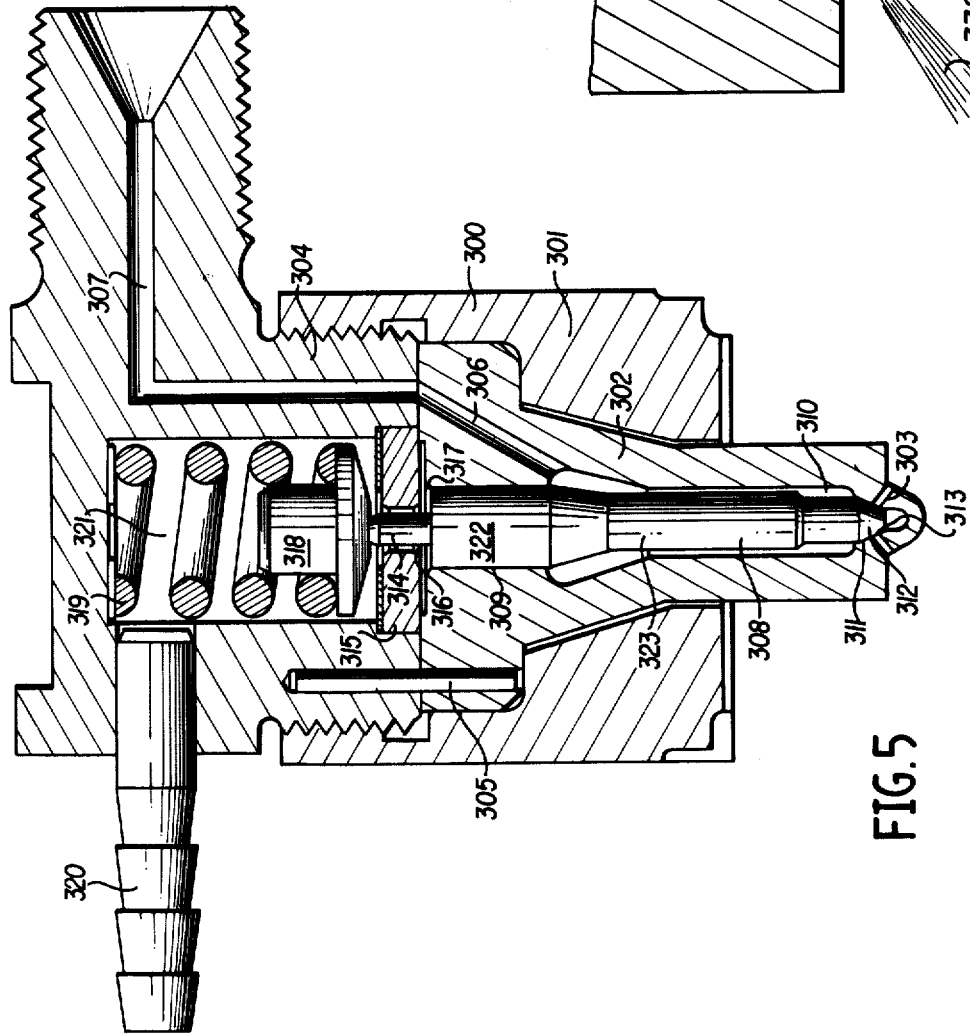

In the Drawings:

FIG. 1 provides a schematic, partially sectioned illustration of a single working chamber engine of the burning loci type and illustrates one form of a burning loci engine;

FIG. 2 provides an enlarged, partially sectioned, fragmentary and perspective view of a precompression and control zone of the FIG. 1 engine, illustrating the injection of solid fuel streams into peripherally confined agitation zones;

FIG. 3 provides a top plan view of the piston of the FIG. 1 engine, schematically illustrating the manner in which burning loci are generated and maintained, particularly and principally during the working stroke of the piston;

FIG. 4 provides a transversely sectioned view of the FIG. 2 precompression chamber and further illustrates the burning loci phenomena in a schematic sense;

FIG. 5 provides an enlarged longitudinally sectioned view of the modified injection nozzle incorporated in the FIG. 1 engine, which modification is operable to produce a billowing or diverging injection pattern at lower speed and/or load conditions and a generally or relatively solid stream pattern at higher or normal speed and/or load conditions;

FIG. 6 provides a still further enlarged, longitudinally sectioned view of the tip of the FIG. 3 nozzle, illustrating the position of the injection nozzle valve at a low load condition; and FIG. 7 provides a still further enlarged longitudinally sectioned view of the tip of the FIG. 5 nozzle, illustrating the position of the injection nozzle valve at a higher or normal load condition.

GENERAL CHARACTERISTICS - SPACED BURNING LOCI ENGINE

General operating characteristics of a spaced burning loci engine will now be briefly reviewed with reference to FIGS. 1, 2, 3 and 4.

The exemplary spaced burning loci engine 1 depicted in FIG. 1 includes a working cylinder 2 and an air pumping cylinder 3, both of which are connected with and communicate with a crankcase 4. A working piston 5 is reciprocably mounted in cylinder 2 while an air pumping piston 6 is reciprocably mounted in pumping cylinder 3. Connecting rods 7 and 8 extend respectively from pistons 5 and 6 to a crankshaft 9.

An air transfer conduit 10 extending from outlet port 11 of pumping cylinder 2 to an air inlet port 12 of the working cylinder 2.

Air enters the pumping cylinder 3 through air inlet port means 13. Exhaust gas exits from working cylinder 2 through exhaust port means 14.

The mode of operation of cylinders 2 and 3 along with pistons 5 and 6, which cause the pumping of air to working cylinder 2 is described in detail in the aforesaid Kruckenberg U.S. Pat. No. 3,543,735.

An engine operated fuel pump 15 is connected by conduit means 16 to an injection nozzle 17. The injection nozzle 17 includes a terminus 18 having a plurality of fuel discharging orifices positioned in a precompression cavity or chamber 19.

Precompression cavity or chamber 19 is located in cylinder head 20 of working cylinder 2.

As shown in FIGS. 1 and 2, working piston 5 includes a wafer-like protrusion 21 projecting from the piston head 22 toward the precompression cavity 19.

Protrusion 21 is operable to be telescopingly received within the precompression chamber 19 during the end of the compression stroke of the piston 5 and the beginning of the working stroke.

A series of circumferentially spaced and generally longitudinally extending slots 23, which may be axially oriented or generally inclined, are formed on the periphery of protrusion 21. With the protrusion received within the precompression chamber 19, as generally shown in FIG. 1, the slots 23 cooperate with the side wall 24 of the precompression chamber 19 to peripherally confine and generally define a series of agitation zones 25 which are circumferentially spaced about the axis of reciprocation of piston 2.

While such agitation zone defining cooperation exists between the protrusion 21 and the precompression chamber wall 24, fuel outlet orifices 26 at the tip of the injection nozzle 18 are operable to direct generally solid streams of fuel individually into these agitation zones 25. Thus, for example, a representative fuel stream 27, shown in FIG. 3, is directed individually into one agitation zone 28 of the plurality of zones 25. As is described in the aforesaid Kruckenberg et al. patent and application, the inlet mouth 29 of each agitation zone 25, including zone 28, is sufficiently large as to receive a fuel stream 27 throughout the period of time that the slots 23 of the protrusion 21 are telescopingly received within the wall 24 so as to define the agitation zones 25.

Commencing at or just shortly before the top dead center crankshaft position of the piston 2, the injection nozzle 18 commences to inject fuel from orifices 26 into the precompression chamber such that the preponderance of fuel is directed into the agitation zones 25 during the initial part of the down stroke of the piston 2.

A consequence of this phenomena is the generation of spaced burning loci or centers 30, which are schematically depicted in FIGS. 3 and 4. These burning centers 30 are spaced and generally discrete in nature and are maintained during the working stroke of the piston while fuel is being injected.

Thus, the mode of operation of engine 1 is such that within the cylinder 2, the plurality of spaced burning loci 30 are generated, with these loci 30 remaining generally mutually distinct or discrete and defining spaced centers of burning. These spaced centers of burning are located generally adjacent and in energy communicating relation with the head 22 of the piston 5.

During a working or down stroke of the piston 5, combustion supporting gas, heated by compression and some limited combustion within the precompression chamber, is transmitted from the precompression chamber 19 through the agitation zones 25 and into the burning loci 30. In addition and concurrently, the fuel streams 27 are generated and transmitted into these burning centers.

Thus, during the working stroke, heated combustion supporting gas, i.e. air with some products of combustion, and fuel streams pass through the agitation zones 25 where intensified fuel-air heating and mixing occurs. This phenomena, coupled with the peripherally confining effect of the agitation zones, produces and generates the burning centers or loci 30, with each individual loci 30 and its associated agitation zone 25 receiving at least one individual solid fuel stream and at least some heated gas.

As is described in the aforesaid Kruckenberg et al. application, it is believed that burning is initiated during each working stroke of the piston 5 through ignition of fringe portions of each stream 27 at the commencement of each individual fuel injection cycle as effected by the nozzle 18. By controlled operation of the fuel injection system, the time duration of the generation of the fuel streams 27 is limited so at least the majority of fuel in the streams 27 passes into the loci 30 during the working or down stroke of the piston 5.

The spaced wall means or slots 23 thus each function to peripherally confine and define an individual fuel and heated gas agitation zone 25 which is individually associated with and communicates with a burning loci. Each such agitation zone 25 and the burning loci 30 associated therewith receives fuel from at least one fuel stream directed thereinto during the working stroke of the piston 5. The spaced and generally discrete relation of the burning loci 30 are maintained during the working stroke of the piston 5 and the energy generated through the operation of the burning loci is utilized to induce the working stroke of the piston 5.

A representative spaced burning loci engine has now been reviewed, such that the preferred context of the practice of this invention has been established. Thus, it now becomes appropriate to consider the technique presented through this invention for improving the spray injection characteristics of the burning loci type of engine.

MODIFICATION OF INJECTION SPRAY CHARACTERISTICS

Through this invention it has been discovered that at lower load and/or conditions, when an engine is relatively cool, a spaced burning loci engine which has been optimized for higher (including normal) speed and/or load operation may, at times, not operate as smoothly as would be desired.

Through this invention a technique has been developed for improving or modifying the spray characteristics of fuel injected at low speed and/or load conditions (i.e. at or near idle) so as to reduce the generation of excessive, unburned fuel and generally reduce engine knocking and rough engine performance. This technique has been developed in light of the fact that a conventional, constant dimension orifice will tend to generate a "needle-like" spray at a low load and/or speed condition and thus tend to lose the "fuzz" or peripheral spray which is normally associated with the "solid" fuel stream core at normal and/or high engine load and/or speed conditions.

The manner in which the fuel stream sprays are modified to attain this improvement in engine performance will now be described with reference to FIGS. 5, 6 and 7.

FIG. 5 depicts a modified fuel injection nozzle 300 which may be employed as the fuel injection nozzle means in connection with the spaced burning loci engine described in the aforesaid Kruckenberg et al U.S. Pat. No. 3,543,735, in the aforesaid Kruckenberg et al. application Serial No. 93,269, or in the preceding discussion of the present invention.

Injection nozzle 300, which may function as the aforesaid nozzle means 26, may include an outer body or housing 301 within which an internal body means 302 is telescopingly mounted.

Nozzle body 302 may include, at its lower end, a plurality of downwardly or outwardly directed spray defining orifices 303. One such orifice would be provided in relation to each agitation zone 25 described in connection with FIGS. 2, 3 and 4.

Internal body 302 may be secured in position by a thread fitment 304. A pin 305 may be telescopingly received within aperture means of elements 304 and 302 so as to permit controlled rotational positioning of the body 302 relative to the fitment 304. This alignment function will ensure that a fuel passage 306 of internal body 302 is disposed in communicating relation with an inlet fuel passage 307 of fitment 304.

A valve member 308 may be telescopingly received within a cylinder portion 309 of fitment 302 and project downwardly through fuel passage 310. Passage 310 may provide communication between the transfer passage 306 and a valve seat 311.

Valve seat 311 is generally frustoconical in nature and is intersected at its lower end by the orifices 303. A frustoconical valve member tip 312 is operable to matingly and conformingly engage the seat 311, in the seated position of the valve 308, and overlap and close the inlet mouths 313 of the orifices 303.

A piston-like extension 314 projects upwardly (as shown in FIG. 5), from valve body 308 through a wafer or disc-like valve stop 315. Valve stop 315 has an annular shoulder means 316 which is operable to engage a ledge 317, carried by the upper end of the valve member 308, so as to limit and define the uppermost or fully open valve position.

An inverted, mushroom-shaped fitment 318 may abuttingly engage protrusion 314 and be pressed or biased toward this protrusion by a coil spring 319.

In a conventional manner, a vent 320 may be provided in fitment 304. This vent would communicate with a cavity 321 within which the spring 319 is mounted. The function of the vent 320 would be to remove from the nozzle that fuel which leaks around the portion of the valve 308 which is received within a valve body cylinder portion 309.

As will be noted from FIG. 5, a piston-like portion 322 of valve 308 which may be provided and received within the cylinder portion 309 may be somewhat larger in diameter than a lower valve portion 323 which projects into the cavity 310. This difference in diameter permits the valve member 308 to raise in response to the pressure of fuel in the cavity 310 so as to permit the ejection of fuel through the orifices 303.

At normal or relatively higher engine speed and/or load conditions, the pressure of fuel in the cavity 310 would be at a relatively higher level so that the valve 308 would tend to stabilize in a fully open position, with the stop 317 engaging the abutment 316.

This fully opened valve position is depicted in FIG. 7. As shown in FIG. 7, the frustoconical surface 312 has been displaced from its FIG. 5 position of overlying cooperation with the orifice inlets 313. As is schematically shown in FIG. 7, with the valve 308 thus raised, fuel enters the inlets 313 in a generally axial pattern and fuel exits from orifices 303 in the form of generally solid, (i.e. discrete, cohesive, or not fully atomized) fuel streams 332, albeit possibly of a somewhat or limited diverging nature.

During lower speed and/or load conditions it is contemplated that the pressure in cavity 310 would be significantly less than the pressure existing in this cavity at normally higher load and/or speed conditions. Such a lower pressure condition may be achieved by operation of a diversion valve of the type described in the aforesaid application filed by us on even date herewith, and the disclosure of which is herein incorporated by reference. This valve diverts fuel from a conduit extending from a fuel pump to the injection nozzle.

Thus, by appropriately selecting the biasing strength of coil spring 319, this lower pressure in cavity 310 may be caused to only partially elevate the valve 308 so that it assumes the intermediate position schematically depicted in FIG. 6. Such a position of valve 308 could be a consequence of the open position of valve 109.

In this intermediate valve position, the fuel pressure in cavity 310 acting on the valve body piston portion 322 would be such as to only partially overcome the force of spring 319 and not sufficient to fully overcome this spring force to the extent necessary to raise the stop 317 into abutting engagement with the abutment 316.

In this intermediate valve position as depicted in FIG. 6, the surface 312 of the valve tip will at least partially overlap the inlet mouths 313. This partially overlapped condition, as schematically shown by flow arrows in FIG. 6, will cause a generally radial flow of fuel into the orifice inlets 313. It has been observed that where this generally radial inflow occurs, a billowing, or more atomized or widely diverging flow stream 333 will issue from the orifices 303.

This relatively billowing stream 333 is significantly more atomized than the generally cohesive or solid stream 332 generated in the fully open valve position depicted in FIG. 7.

Thus, with this arrangement, and at relatively lower speed and/or load conditions of the engine, the FIG. 6 valve position will automatically result due to a lower fuel pressure condition. This valve positioning will improve the performance of the burning loci engine at this engine range by making ignition more facile.

The two-stage characteristics of the nozzle depicted in FIGS. 5, 6 and 7 will also tend to produce an enhanced "fuzziness" or degree of atomization during the initial opening of the injection valve, even at normal or relatively even higher engine speed and/or load conditions. This phenomena, in and of itself, will tend to improve and facilitate the commencement of fuel burning or ignition during each working cycle of the spaced burning loci engine. However, at relatively higher engine temperatures encountered during normal engine operating conditions and at even higher speed and load conditions and preferably during at least the majority of each injection increment (i.e. after the commencement period), generally solid fuel streams will be injected as heretofore noted in connection with the characteristic mode of operation of spaced burning loci engines.

All this notwithstanding, and even with the use of the two-stage injection nozzle as above described, the burning loci engine, for the most part, will certainly during normal and even higher engine speed and/or load conditions, operate with the burning loci being generated and maintained substantially in the manner described in the Kruckenberg et al U.S. Pat. No. 3,543,735 and the Kruckenberg et al application Ser. No. 93,269.

By way of example, it is contemplated that the two-stage phenomena may be advantageously accomplished within the following dimensional parameters:

| | | Lower Load (FIG. 6) | Higher Load (FIG. 7) |
|---|---|---|---|
| 1) | Needle Lift | (.004'' – .005'') ± | (.016'' – .018'') ± |
| 2) | Diameter of Orifice 303 | .009'' | .009'' |
| 3) | Length of Orifice 303 | .040'' ± | .040'' ± |
| 4) | Slope of Axis of Orifice 303 Relative to Longitudinal Axis of Valve 308 | 50° ± | 50° ± |
| 5) | Slope of Surfaces 311 and 312 Relative to Longitudinal Axis of Valve 308 | 60° ± | 60° ± |
| 6) | Axial Height of Frustoconical Tip 312 | .040'' | .040'' |

While the control over valve positions, previously noted, has resulted from the mere balancing of spring and fuel pressure, those skilled in the art will recognize that cam mechanisms operated by the engine itself could be employed to provide positive stop means operable to regulate the positions of the valve tip 312 as required for relatively lower, as well as relatively higher, engine load and/or speed conditions.

MAJOR ADVANTAGES AND SUMMARY OF INVENTION

The concept presented through this invention entailing modifications of displacement increment of fuel pumps, coupled with the diversion phenomena, contributes to a significantly enhanced and smoother performance characteristic for the burning loci type engine, particularly at lower engine speed and/or load conditions.

Significantly, this is achieved without adversely affecting the basic advantages of the burning loci type engine where they are most important, i.e. at normal and even higher engine loads.

The two-phase spray characteristic phenomena contributes to ease of ignition of burning under all engine conditions and is believed to provide smoother engine performance at low load conditions.

Somewhat surprisingly, it has also been discovered that the two-phase concept of this invention tends to minimize the clogging of fuel nozzles. In fact, it has been noted in certain instances that effectively operable nozzle orifice life, prior to clogging, may be extended from somewhere on the order of 5 to 30 hours up to on the order of 250 hours, and more.

This increase in nozzle operating life may be due to the fact that the fuel flow through the orifices, which produces the billowing spray pattern, tends to flush pockets of "stagnant" fuel out of the orifice. Such quiescent zones could tend to form adjacent longitudinally intermediate orifice wall zones due to a contracted nature of solid fuel stream flow in such areas. The formation of such "stagnant" or quiescent zones would be conducive to fuel oxidation, thereby inducing orifice clogging.

Those skilled in the fuel injection art are aware that two-phase injection nozzles, which operate in a different manner at different conditions of valve position, are known. For example, a U.S. Kenworthy Pat. No. 1,833,080 discloses a two-stage nozzle where at a condition of partial lift a frustoconical tip opens some orifices, while at a full lift condition still other orifices are open. A similar disclosure is contained in a U.S. Lang Pat. No. 2,757,967. However, art such as this does not suggest the two-stage concept of the present invention or the context of the spaced burning loci engine. If anything, since the basic operating characteristic of the burning loci engine involves the use of relatively solid fuel streams, one would not expect or anticipate recourse to two-stage nozzles, with one stage involving a billowing spray, where the burning loci engine was concerned.

While a variety of modifications with respect to apparatus and techniques have been presented in, and suggested through, this disclosure, as well as the disclosures of the aforesaid Kruckenberg et al U.S. Pat. No. 3,543,735 and the Kruckenberg at al. application Ser. No. 93,269, those skilled in the art and familiar with the present disclosure may well envision other modifications, additions, deletions, substitutions or changes which would fall within the purview of the invention as set forth in the appended claims.

What is claimed is:

1. In a method of effecting combustion in internal combustion engines, which method is characterized by the steps of:

generating, within internal combustion engine means, and in energy communicating relation with engine piston means movable in cylinder means of said engine means, a plurality of generally mutually distinct burning loci, with said burning loci defining generally spaced centers of burning;

concurrently, and during a working stroke of said engine piston means, transmitting combustion supporting gas, heated by compression and combustion, into said burning loci, and generating and transmitting streams of combustible fuel into said burning loci, each said burning loci substantially receiving at least one of said fuel streams and at least some of said heated gas;

limiting the time duration of the generation of said fuel streams so that at least the majority of fuel in said streams passes into said burning loci during a working stroke of said engine piston means;

providing a plurality of spaced wall means, with each such wall means peripherally confining and defining a fuel and heated gas agitation zone individually associated with and communicating with a said burning loci;

each said peripherally confined agitation zone and a burning loci associated therewith receiving fuel from at least one fuel stream directed thereinto during said working stroke of said engine piston means;

maintaining the existence and a generally discrete relation of said burning loci during said working stroke of said engine piston means and utilizing energy generated through operation of said burning loci to induce said working stroke of said engine piston means;

the improvement comprising, in combination with said steps, the additional steps of:

providing a fuel injection nozzle with a plurality of orifices, all of which orifices are located in a common plane and are each directed toward a respective burning loci, slidably disposing a spring-biased valve tip in said nozzle such that said valve tip is subjected to and is responsive to the pressure of fuel being fed through said nozzle to open said orifices against its spring bias;

transmitting fuel through passage means leading from fuel pump means to said fuel injection nozzle means to generate said fuel streams through said orifices such that said fuel streams are directed into said respective agitation zones and burning loci associated therewith;

during a relatively lower engine speed and/or load condition maintaining a portion of said valve tip within said common plane of said orifices and adjacent said orifices to partially obstruct an inlet of each of said orifices to provide a partial obstruction to the entry of fuel into said orifices in a manner restricting said flow of fuel toward said orifices to a relatively thin flow path extending transversely of each of said inlet means of said plurality of orifices to:

eliminate relatively quiescent, stagnant flow zones within said orifices, and produce a generally diverging and relatively atomized spray of fuel leading from said orifices to said burning loci; and during a relatively higher engine speed and/or load condition displacing said valve tip means free of said common plane to remove said flow obstruction in a manner permitting said fuel to flow substantially axially toward said orifices and form generally solid configurations of fuel streams leaving said orifices and directed toward said agitation zones and burning loci associated therewith.

* * * * *